United States Patent Office 3,570,230
Patented Mar. 16, 1971

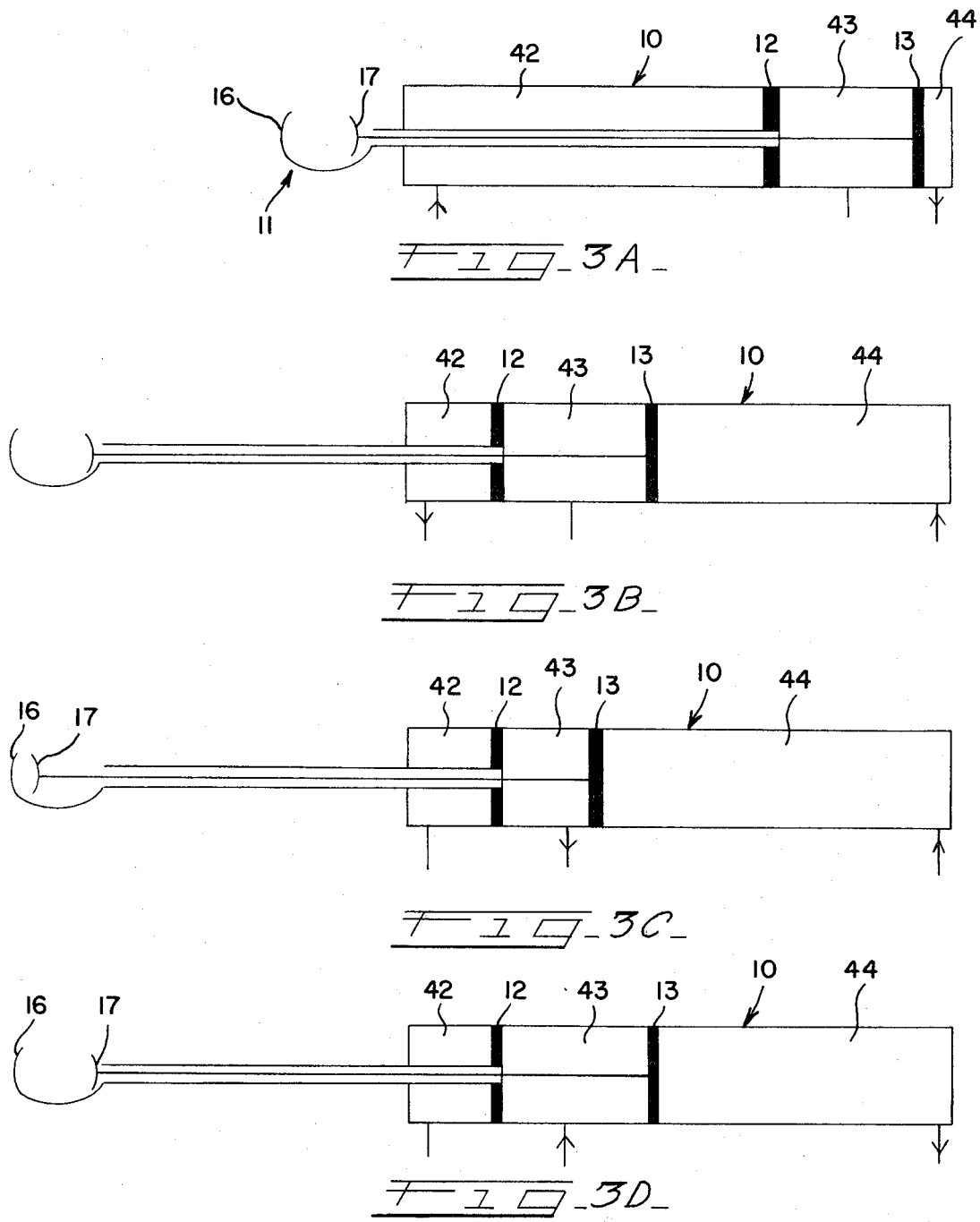

3,570,230
TREE GRIPPING CLAMP AND BOOM AND CONTROL SYSTEM THEREFOR
Stuart D. Pool, Naperville, Edward Svereika, Chicago, and Calvin P. Rickerd, La Grange Park, Ill., assignors to International Harvester Company, Chicago, Ill.
Filed July 9, 1968, Ser. No. 743,360
Int. Cl. A01g 19/08
U.S. Cl. 56—328                                    11 Claims

ABSTRACT OF THE DISCLOSURE

A boom assembly for a tree shaker apparatus wherein the assembly includes a hydraulic cylinder within which a pair of pistons are mounted in axially spaced relation to define a plurality of fluid chambers. A tree gripping clamp includes a pair of jaws connected respectively to the pair of pistons. Hydraulic control means are operative to move the clamp structure relative to the cylinder and to move the jaws relative to each other by controlling the fluid pressure within the fluid chambers. Means are provided for rotating the clamp structure relative to the boom assembly.

BACKGROUND OF THE INVENTION

Field of the invention

The invention relates generally to work-gripping tools and more particularly to a clamp and boom structure adapted to grip a tree for a fruit harvesting operation.

Description of the prior art

Tree shaker machines are characterized by including a boom which supports a tree-gripping clamp on an end thereof. The boom is usually swingably supported on a mobile support (a tractor, for example) so that the clamp may be positioned to grip selected branches of a tree to be shaken.

The boom and clamp assemblies of known machines have presented several difficulties. A primary problem is that the typical boom is of very substantial length. Consequently, the boom may be unwieldy and difficult to swing and pivot relative to the supporting structure. Moreover, booms of substantial length tend to whip or oscillate during the reciprocation of the assembly as the branches are shaken to dislodge the fruit. In addition to producing undesirable stress in the boom itself, the whipping or oscillating action tends to increase the vibrations being transmitted to the supporting structure with the attendant disadvantages.

Since many booms are of fixed length the above problems are present in each and every shaking operation. Booms of fixed length may require that the entire machine be repositioned or that the boom be movably supported relative to the mobile support in order to sequentially position the clamp on the various branches of a tree. Moreover, booms of fixed length preclude the entire tree shaking machine from being arranged in a compact manner for ease of maneuverability and transport in and between working stations.

SUMMARY

With the foregoing in mind it is an object of the invention to provide a novel boom and clamp assembly adapted for use in a tree shaker apparatus wherein the boom is extensible and retractable to position the clamp structure at selected positions relative to the body of the boom with the result that the assembly provides flexibility of operation unattainable with booms of a fixed length.

It is another object in accordance with the preceding object to provide an assembly wherein the boom is extensible a substantial distance in relation to its retracted length so that the effective working range may be maximized, while the length of the boom may be minimized upon retraction to provide a compact arrangement.

It is another object to provide a boom and clamp assembly wherein the clamp structure includes a pair of opposed jaws which are separable in response to extension of the boom with the result that the clamp structure is automatically open to receive a tree branch upon extension of the boom.

Yet another object is to provide a boom and clamp assembly including means providing rotation of the clamp structure at any point within the range of extension and retraction of the clamp structure to facilitate orienting the clamp structure proximate to tree limbs to be gripped.

Another object is to provide a boom and clamp assembly which is hydraulically operated and controlled by means of a control system providing positive remote control of all operations.

It is still another object in accordance with the preceding object to provide a hydraulic control system in which problems of cavitation and excess pressures are eliminated.

Briefly, these and other objects and advantages of the invention are attained by providing a tree gripping tool having a body adapted for mounting on a tree shaker apparatus. A clamp structure including a pair of opposed jaws is mounted on the body for movement toward and away from the body. Means are included for separating the opposed jaws in response to movement of the clamp structure away from the body. The clamp structure is rotatable relative to the body to facilitate orienting the jaws proximate to a tree limb to be gripped for a subsequent tree shaking operation.

BRIEF DESCRIPTION OF DRAWINGS

FIG. 3A is a schematic view of the boom and clamp assembly in a retracted position;

FIG. 3B is a schematic view of the boom and clamp assembly in an extended position;

FIG. 3C is a schematic view of the boom and clamp assembly showing the clamp assembly in a closed or gripping position; and FIG. 3D is a schematic view of the boom and clamp assembly showing the clamp assembly in an open or released position.

DESCRIPTION OF THE PREFERRED EMBODIMENT

Figure 1:
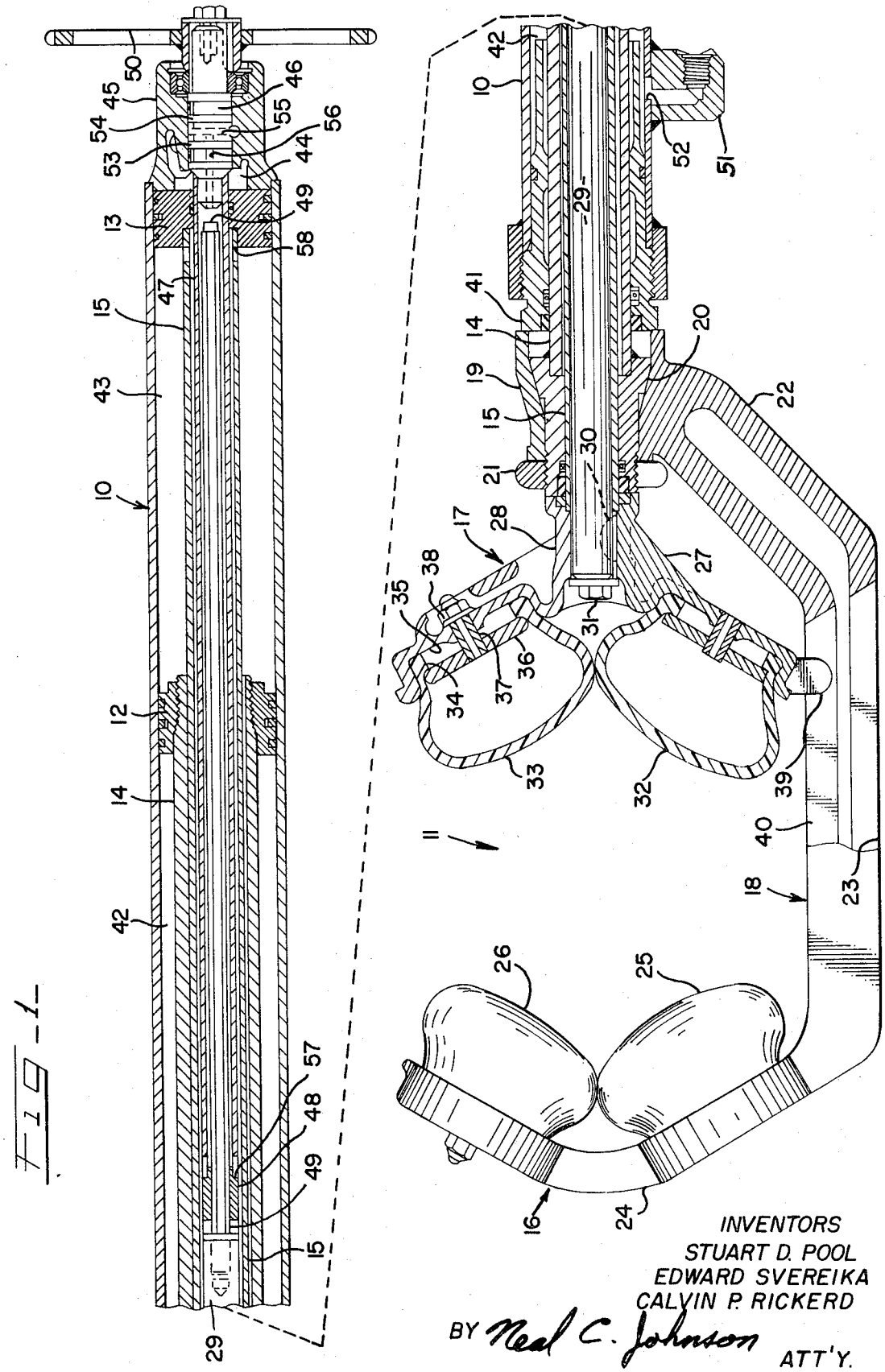
FIG. 1 is a view partly in cross section of the boom and clamp assembly of the invention.

Referring first to FIG. 1, there is shown a boom and clamp assembly including a cylinder 10 and a clamp structure 11 extending therefrom. The illustrated assembly may be mounted on a tree shaker apparatus for gripping a tree to shake fruit therefrom. By way of example the assembly could be mounted on the mobile carrier disclosed in U.S. Patent No. 3,059,402 wherein the assembly is swingably supported for gripping a tree and reciprocable to shake fruit from the tree.

First and second annular pistons 12 and 13 are slidably received within the cylinder 10 and axially spaced as shown. A tubular member 14 is threadedly connected to the piston 12 and extends outwardly beyond the end of the cylinder 10. A tubular element 15 is connected to the piston 13 and extends through the piston 12 and tubular member 14 outwardly beyond the end of the tubular member 14 as shown.

The clamp structure 11 includes a pair of relatively movable jaw assemblies 16 and 17 adapted to grip a tree limb therebetween. The jaw assemblies 16 and 17 are connected to the outer ends of the members 14 and 15 respectively. The jaw assembly 16 includes an arm 18 having a hub portion 19 which is mounted on a mounting sleeve 20 welded to the end of the tubular member 14. A lock nut 21 holds the hub portion 19 on the mounting sleeve 20 as shown. The arm 18 includes a portion 22 extending laterally and forwardly from the hub portion 19, a portion 23 extending forwardly from the portion 22, and a portion 24 extending laterally from the portion 23 across the extended center line of the cylinder 10 in axially spaced relation to the outer end of the cylinder. A pair of flexible pads 25 and 26 are mounted on the arm portion 24 and are disposed to face rearwardly toward the cylinder 10.

The jaw assembly 17 includes a yoke 27 having a central hub portion 28. A cylindrical rod 29 is fixed within the tubular element 15 and extends beyond the outer end of the element 15 as shown. The hub portion 28 is keyed on the rod 29 by a key member 30 and the yoke 27 is retained on the rod 29 in abutting relation to the outer end of the tubular element 15 by a bolt assembly 21.

A pair of flexible pads 32 and 33 are mounted on the yoke 27 in opposed relation to the pads 25 and 26. Each of the pads includes an annular rib or flange 34 seated in a circular recess 35 defined on the respective members 24 and 27. An annular plate 36 engages the rib 34 and is secured in position by a bolt 37 and nut 38 as shown.

The yoke 27 includes a tab 39 extending toward the arm 18 and is received in a slot 40 defined along the length of the arm portion 23.

A gland 41 is threadedly coupled to the outer end of the cylinder 10 and includes suitable sealing rings encircling the tubular member 14. Accordingly an annular expansible chamber 42 is defined axially between the piston 12 and the gland 41 and radially between the member 14 and cylinder 10. Another expansible chamber 43 is defined between the pistons 12 and 13. A third expansible chamber 44 is defined between the piston 13 and a head member 45 secured to the end of the cylinder 10 as shown.

The jaw assemblies 16 and 17 are adapted to be rotated as a unit about the longitudinal axis of the boom at any point along the extension of the jaw assemblies from the cylinder 10. A spool 46 is journaled within the head 45 and extends axially of the boom as shown. An elongated tube 47 is secured to the spool 46 and extends axially of the boom within the tubular element 15. A sleeve 48 is secured to the outer end of the tube 47. An elongated bar 49 is fixed to the end of the rod 29 and extends axially through the sleeve 48 and tube 47 as shown. The bar 49 is hexagonal in cross section, as is the central bore of the sleeve 48 through which the bar 49 is slidably received. A sprocket gear 50 is keyed and bolted on the spool 46. The gear 50 is adapted to be rotated by suitable power driven or manually operated mechanisms (not shown).

It will be seen that rotation of the gear 50 rotates the spool 46, tube 47, and sleeve 48. The complementary engagement of the sleeve 48 on the bar 49 insures that the bar 49 is likewise rotated regardless of its longitudinal or axial position within the cylinder. Since the bar 49 is fixed to the rod 29, and the rod 29 is fixed within the tubular element 15, it will be seen that the yoke 27 is rotated. The engagement of the tab 39 in the slot 40 imparts conjoint rotation to the arm 18 about the longitudinal axis of the boom.

Each of the chambers 42, 43, and 44 is adapted to be connected to a source of pressure fluid. The chamber 42 is supplied with pressure fluid through a fitting 51 mounted on the cylinder 10 in communication with a port 52 defined through the cylinder wall proximate to the gland 41.

Pressure fluid is communicated to the chamber 43 in the following manner. The spool 46 includes a pair of axially spaced annular lands 53 and 54. A port (not shown) extends through the head member 45 in communication with the annular space defined between the lands 53 and 54. The spool 46 is cross drilled at 55 and communicates with a bore 56 defined axially through the spool so as to communicate with the interior of the tube 47. Ports 57 are defined through the tube 47 proximate to the sleeve 48 so as to communicate with the interior of the tubular element 15. Ports 58 are defined through the element 15 proximate to the piston 13 so as to communicate with the chamber 43.

Pressure fluid is admitted into the chamber 44 by means of a bore (not shown) defined through the head member 45 in communication with the chamber 44.

Figure 2:
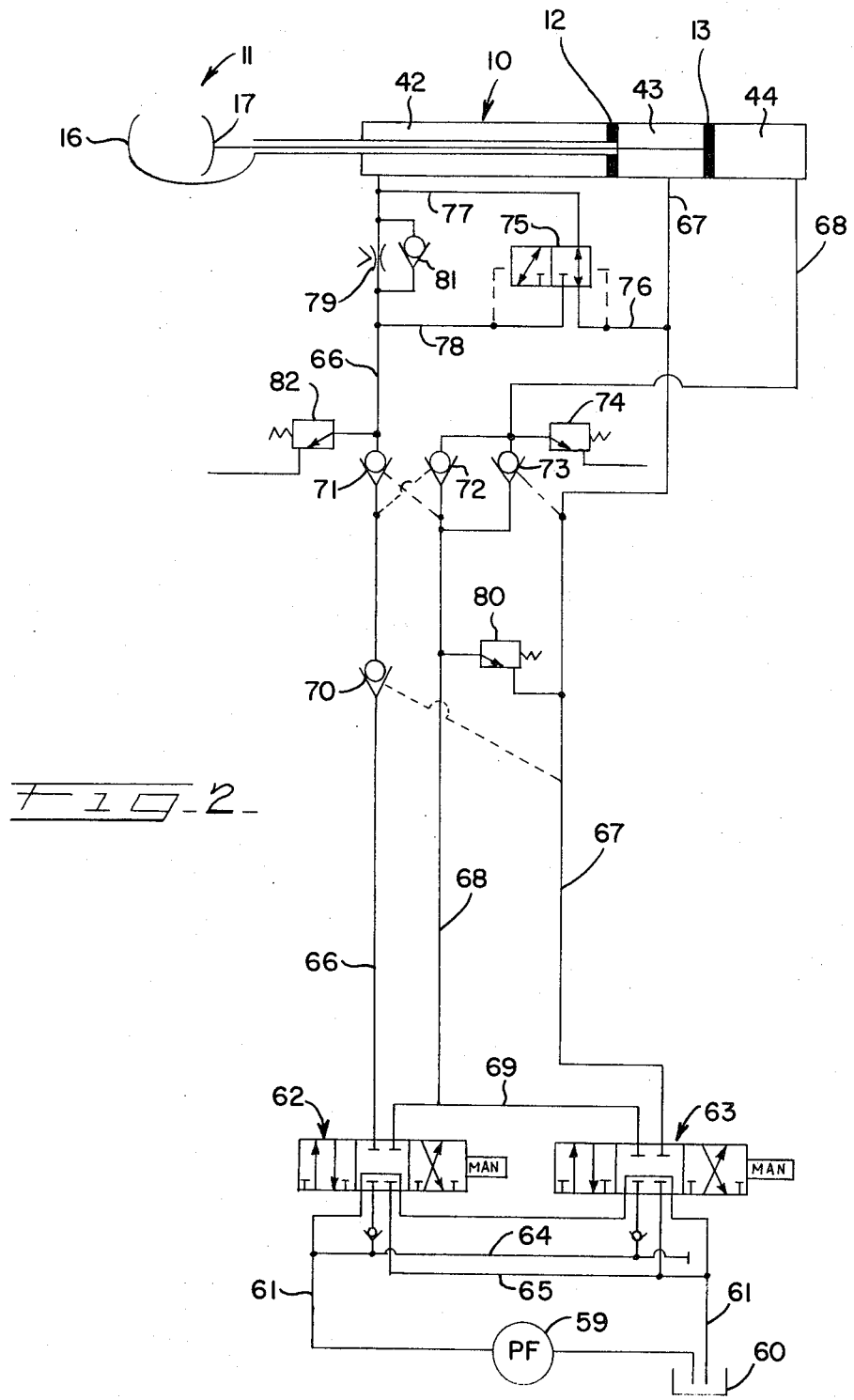
FIG. 2 is a schematic view of the boom and clamp assembly and the hydraulic control system.

The boom and clamp assembly of the invention is hydraulically operable by a system shown schematically in FIG. 2. Hydraulic power is provided by a pump 59 which draws hydraulic fluid from a sump 60. The pump 59 supplies pressure fluid through a pressure line 61 to a pair of flow control valves 62 and 63 connected in series by the line 61 which leads back to the sump 60. In the illustrated embodiment of the invention each of the valves 62 and 63 comprises a three position, six-way, spring-centered, manually operated, open-center type valve of known construction. A pressure line 64 branches from the pressure line 61 and connects the valve 62 and 63 in series as shown. A line 65 connects each of the valves to the line 61 and thus back to the sump 60.

It will be seen that with both the valves 62 and 63 in neutral position as shown, the pump 59 will deliver pressure fluid through the pressure line 61 to the valves 62 and 63 and then back to the sump 60. The hydraulic circuit including the lines 64 and 65 provides pressure fluid at the valves 62 and 63 regardless of whether either valve is actuated. In other words, pressure fluid is available at the valve 63 even if the valve 62 is actuated.

In general the valves 62 and 63 control the flow of hydraulic fluid to and from the chambers 42, 43 and 44 of the boom and clamp assembly. The expansible chamber 42 is connected to the valve 62 through a line 66. The expansible chamber 43 is connected to the valve 63 by a line 67 and the expansible chamber 44 is connected to the valves 62 and 63 by lines 68 and 69 as shown. The line 66 includes pilot-operated check valves 70 and 71 which are unseated in response to pressurization of lines 67 and 68 respectively. The line 68 includes a pilot-operated check valve 72 which is unseated in response to pressurization of line 66. A pilot-operated check valve 73 is connected in parallel with the check valve 72 and is unseated in response to pressurization of line 67.

To extend the clamp structure 11 away from the cylinder 10, the valve 62 is actuated to direct pressure fluid from the pressure line 64, through lines 69 and 68 to the chamber 44. The fluid trapped in the chamber 43 exerts a pressure in line 67 sufficient to unseat the check valve 70, while the pressure in line 68 unseats check valve 71. Fluid in chamber 42 is thus permitted to flow through the line 66 back to the sump through the valve 62. Accordingly, the pistons 12 and 13 are driven from the retracted position of FIG. 3A to the extended position of FIG. 3B. A pressure relief valve 74 is connected to the line 68 for relieving excess pressure due to thermal expansion of the oil locked in chamber 44 during exposure of the boom to high temperatures such as storage in direct sunlight. Small quantities of oil are discharged to the atmosphere to relieve extremely high pressures.

The boom is designed such that the jaw assemblies 16 and 17 separate or move away from each other to an open position in response to extension of the clamp assembly 11 away from the cylinder 10 as above described. A pilot-operated shuttle valve 75 of known construction is connected between the lines 66 and 67 by lines 76, 77, and 78. The valve 75 is operable in response to pressures in lines 76 and 78 for alternately intercommunicating the chambers 42 and 43 or permitting flow directly through lines 77 and 78.

During the above described clamp extension, the shuttle valve 75 is shifted to the position shown in FIG. 2 permitting flow directly between chambers 42 and 43. The valve 75 shifts due to a throttle valve 79 being connected in the line 66 between the chamber 42 and the line 78. The throttle valve 79 creates a pressure drop thereacross in the line 66 as the fluid flows from the chamber 42. This decreases the pressure in line 78 so that it is less than that in line 76. Accordingly, the valve 75 is shifted to intercommunicate the lines 76 and 77 and hence the chambers 42 and 43.

Referring again briefly to FIG. 1, it will be seen that the piston 12 has a greater end area exposed to chamber 43 than the opposite end area exposed to chamber 42. Due to the differential end areas of the piston 12 and the intercommunication of the chambers 42 and 43, the piston 12 is moved away from the piston 13 thereby effecting separation of the jaw assemblies 16 and 17. Cavitation in chamber 43 is prevented since pressure fluid may flow from the chamber 42 into chamber 43 through the shuttle valve 75.

In order to close the jaw assemblies 16 and 17 as shown in FIG. 3C to grip a tree limb therebetween, the valve 62 is moved to the neutral position and the valve 63 is actuated to deliver pressure fluid through lines 69 and 68 into chamber 44. This also permits chamber 43 to drain to the sump through line 67. Accordingly, the piston 13 is driven to the left to move the jaw assembly 17 toward the jaw assembly 16. During this clamping step the piston 12 does not move since the fluid in chamber 42 is blocked by the check valve 70 in line 66. Moreover, the relative pressures exerted on the shuttle valve 75 cause it to shift from the position shown in FIG. 2 to prevent flow from the chamber 42 into the line 67.

As the tree limb is gripped between the jaw assemblies 16 and 17 the pressure in the chamber 44 will increase. A pressure relief valve 80 is connected between the lines 68 and 67 for relieving the excess pressure in chamber 44 to the sump.

In order to open the clamp assembly as shown in FIG. 3B to release its grip on a tree limb, the valve 63 is actuated to deliver pressure fluid into chamber 43 through the line 67. At the same time chamber 44 is connected to the sump through lines 68 and 69. Accordingly, the piston 13 is driven to the right to move the jaw assembly 17 away from the jaw assembly 16. During the unclamping step the piston 12 remains stationary since the fluid in chamber 42 is blocked by the check valve 71 in line 66. The shuttle valve 75 remains in a position intercommunicating the lines 77 and 78.

To retract the clamp assembly 11 toward the cylinder 10, the valve 62 is actuated to permit pressure fluid to flow into the chamber 42 through line 66. It will be noted that a check valve 81 is connected in the line 66 thus permitting the fluid to bypass the throttle valve 79. Pressure in line 66 unseats the check valve 72 permitting fluid in chamber 44 to flow through lines 68 and 69 and through the valve 62 to the sump. The fluid in chamber 43 is blocked by the valve 63 in its neutral position shown. It will thus be seen that pistons 12 and 13 will be driven to the right to retract the clamp assembly as shown in FIG. 3A. A pressure relief valve 82 is connected to the line 66 for relieving excess pressure due to thermal expansion of the oil locked in chamber 42 during exposure of the boom to high temperatures such as storage in direct sunlight. Small quantities of oil are discharged to the atmosphere to relieve extremely high pressures.

During the retraction step, pressure will rise in the chamber 43 due to a decrease in the volume of the chamber. The volume decreases since the pistons 12 and 13 move to the right to gradually encompass an increasing portion of the tube 47 (FIG. 1) within the chamber 43. When the pressure in chamber 43 exceeds that within the chamber 42, the shuttle valve 75 will be actuated to permit some flow from the chamber 43 into the chamber 42. Consequently, excess pressure is relieved and the structure is not damaged. From the foregoing, it will be seen that the boom and clamp assembly of the invention is uniquely suited to overcome many of the problems associated with prior boom and clamp assemblies.

Various changes within the scope of the invention may occur to those skilled in the art. The invention is therefore not to be thought of as limited to the specific embodiment set forth.

What is claimed is:

1. In a tool having a body, a clamp structure mounted on said body and having a pair of relatively movable opposed jaws, means operative to move said clamp structure away from said body along a straight line, and means for moving said jaws away from each other lengthwise of said line in response to operation of said first mentioned means whereby said jaws are separated upon extension of said first clamp structure from said body.

2. In a tree shaker apparatus adapted for gripping a tree to shake fruit therefrom, a tree-gripping element comprising: an elongated cylinder; clamp structure extending from said cylinder and adapted to be moved away from said cylinder along a linear course, said clamp structure including a pair of opposed jaws movable relative to each other lengthwise of said course; first and second pistons slidably mounted within said cylinder and being axially spaced to define a first fluid chamber between said first piston and an end of said cylinder proximate to said clamp structure and a second fluid chamber defined between said first and second pistons, said first piston having a greater area exposed to said second chamber than to said first chamber, said first and second pistons being connected to said opposed jaws respectively, means for moving said pistons to move said clamp structure away from said boom lengthwise of said course, means for intercommunicating said first and second chambers to permit fluid flow from said first chamber into said second chamber whereby said pistons are movable away from each other to separate said jaws lengthwise of said course in response to movement of said clamp structure away from said cylinder.

3. The subject matter of claim 1, including means for conjointly rotating sid opposed jaws about said straight line.

4. The subject matter of claim 2, including means for conjointly rotating said opposed jaws about said straight line.

5. In a tree shaking apparatus adapted for gripping a tree to shake fruit therefrom, an elongated boom having a clamp structure mounted proximate to an end thereof for gripping a tree, said boom including an elongated fluid-tight cylinder having a head portion opposite said end, first and second pistons reciprocable within said cylinder, said pistons being axially spaced to define a first fluid chamber between said end of said cylinder and said first piston, a second fluid chamber between said pistons, and a third fluid chamber between said second piston and said head portion of said cylinder, said first piston being annular and having a tubular member connected thereto and extending outwardly of said cylinder toward said clamp structure, said first piston having a greater area exposed to said second chamber than to said first chamber, an element connected to said second piston and extending through said first piston and said tubular member outwardly of said cylinder beyond the end of said tubular member, said clamp structure including a pair of jaws connected respectively to the outer ends of said tubular member and said element, and valve means for selectively directing pressure fluid into and exhausting pressure fluid from said first and third chambers while retaining fluid within said second chamber to extend and retract said clamp structure relative to said cylinder.

6. The subject matter of claim 5, including means for intercommunicating said first and second chambers in response to directing pressure fluid into said third chamber, whereby said jaws move apart as said clamp structure is extended from said cylinder.

7. The subject matter of claim 6, wherein said means for intercommunicating said first and second chambers includes pilot-operated valve means operative in response to directing pressure fluid into said third chamber to intercommunicate said first and second chambers.

8. The subject matter of claim 5, including valve means for selectively directing pressure fluid into and exhausting pressure fluid from said second and third chambers to move said jaws toward and away from each other.

9. The subject matter of claim 5, including means for intercommunicating said first and second chambers in response to directing pressure fluid into said first chamber, whereby fluid pressure in said second chamber may be relieved to said first chamber as said clamp structure is retracted toward said cylinder.

10. The subject matter of claim 5, including means for conjointly rotating said element and said tubular member about the longitudinal axis of said cylinder to orient said jaws relative to a tree to be gripped thereby.

11. In a tool having an elongated body, a clamp structure mounted on said body and including a pair of relatively movable opposed jaws, means operative to move said clamp structure as a unit away from said body along a straight line defined by the longitudinal axis of said body, and means for moving said jaws away from each other along said straight line in response to operation of said first mentioned means whereby said jaws are separated upon extension of said clamp structure away from said body.

References Cited
UNITED STATES PATENTS

| | | | |
|---|---|---|---|
| 2,632,341 | 3/1953 | Arp | 92—65X |
| 3,225,529 | 12/1965 | King | 56—328 |
| 3,335,556 | 8/1967 | Edgemond, Jr. | 56—328 |
| 3,377,786 | 4/1968 | Edgemond, Jr. | 56—328 |

RUSSELL R. KINSEY, Primary Examiner

J. N. ESKOVITZ, Assistant Examiner

U.S. Cl. X.R.

92—65